Figure 7:
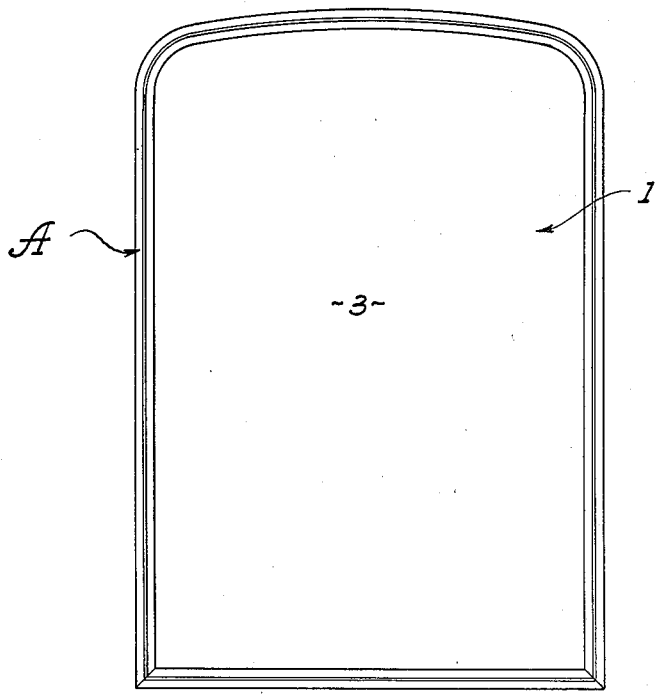

Nov. 25, 1941.  A. WELCH  2,263,831
GASKET FOR REFRIGERATOR DOORS AND THE LIKE
Filed March 22, 1940    2 Sheets-Sheet 1
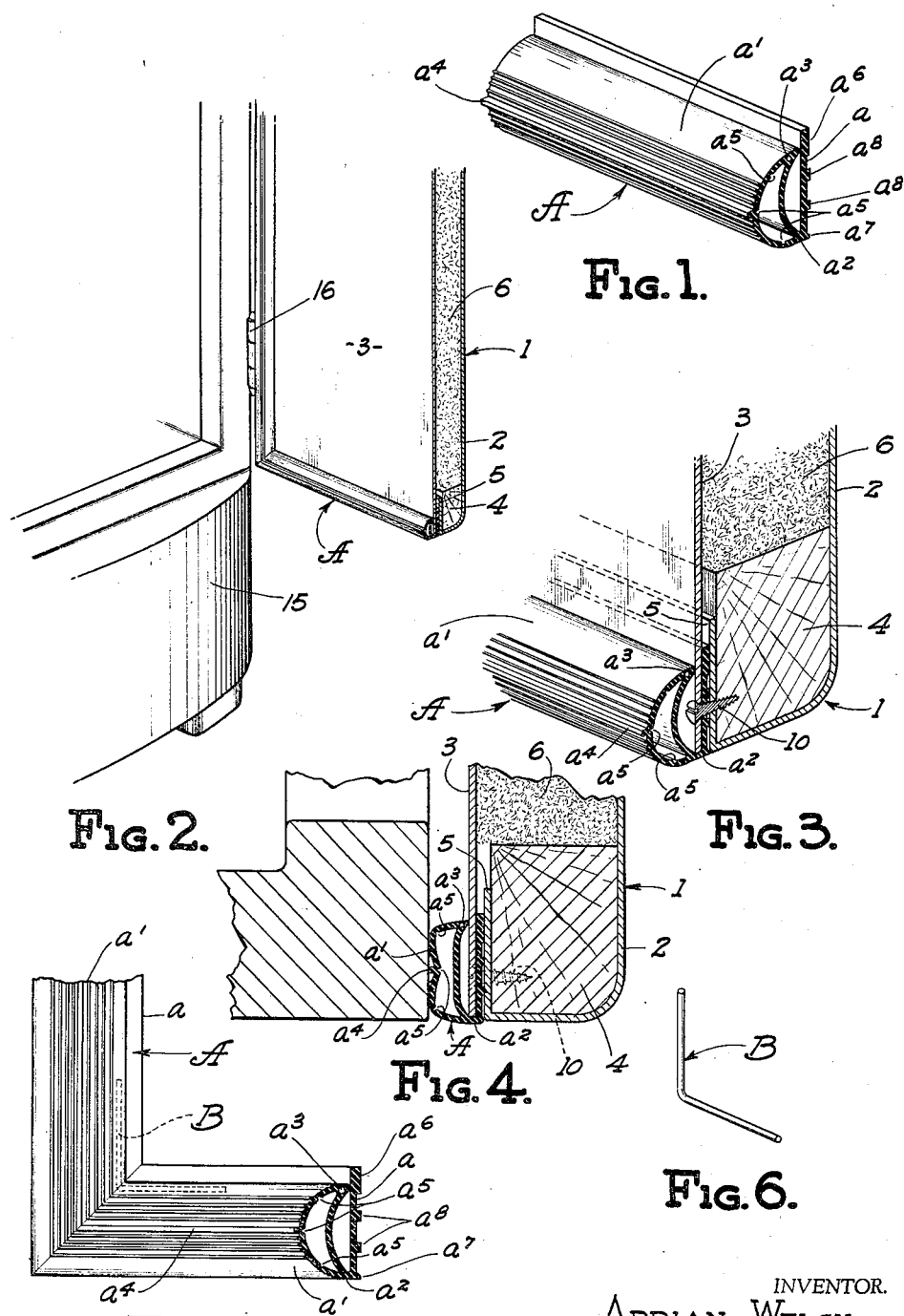

Nov. 25, 1941.   A. WELCH   2,263,831
GASKET FOR REFRIGERATOR DOORS AND THE LIKE
Filed March 22, 1940    2 Sheets-Sheet 2

INVENTOR.
ADRIAN WELCH
BY
Hull, West & Whitton
ATTORNEYS.

Patented Nov. 25, 1941

2,263,831

UNITED STATES PATENT OFFICE 2,263,831

GASKET FOR REFRIGERATOR DOORS AND THE LIKE

Adrian Welch, Middlefield, Ohio, assignor to The Johnson Rubber Company, Middlefield, Ohio, a corporation of Ohio Application March 22, 1940, Serial No. 325,354

5 Claims. (Cl. 20—69)

This invention relates to improvements in gaskets for closures, such as the doors of refrigerators; and it has to do, also, with the method of forming the gasket.

Gaskets of the kind in question are used on closures of various shapes, and it is an object of my invention to produce a gasket of rubber or the like, desirably of the extruded type, that is so constructed, and so formed by my unique method, as to cause it to properly fit rounded or square corners or curved edge portions of closures and to lie flat about such edges.

Another object of the invention is to provide a gasket or gasket strip that is of such design and construction as will facilitate its incorporation in the structure on which it is to be used; that includes an attaching part or flange that is intended to be confined between the marginal portions of inner and outer panels of doors or closures and which part will serve effectively to seal the joint between said panels, and which gasket strip is so shaped as to conceal the fastening means by which said panels are secured together and will yet afford convenient access to the fastening means.

Another object is to provide a pliable gasket or gasket strip incorporating a hollow cushion that is provided with means, desirably in the form of internal longitudinal grooves, that serve to define lines of bending thereby to insure proper action of the cushion when compressed between the closure and the adjacent surface of the structure wherewith the closure is used.

A further object is to so construct the aforesaid cushion as to cause it to present a plurality of separated areas or lines of contact with the parts between which it is compressed, this action being partly the result of the aforesaid means or grooves that define the lines of bending.

A still further object of the invention is to produce an extruded gasket strip of rubber or the like having a longitudinal bore or channel, and sections of which strip are adapted to have their ends joined together; and to associate with such a strip a stiff reinforcing element whose opposite ends are adapted to be inserted into the bores or channels of adjacent ends of the strip sections when said ends are secured together.

More limitedly, it is a purpose of the invention to supply, with a gasket strip of the aforesaid nature, a stiff reinforcing element whose ends are disposed at an angle to each other—as at right angles—for use in making an angle joint, such as a miter joint, between ends of adjoining sections of the strip, the angularly related ends of the reinforcing element being adapted to be forced into the bores of adjacent angularly cut ends of the strip so that when said ends are brought together and vulcanized, the joint will be exceedingly strong, permitting the gasket to be stretched over the edge of a panel without liability of the joint separating.

Figure 8:
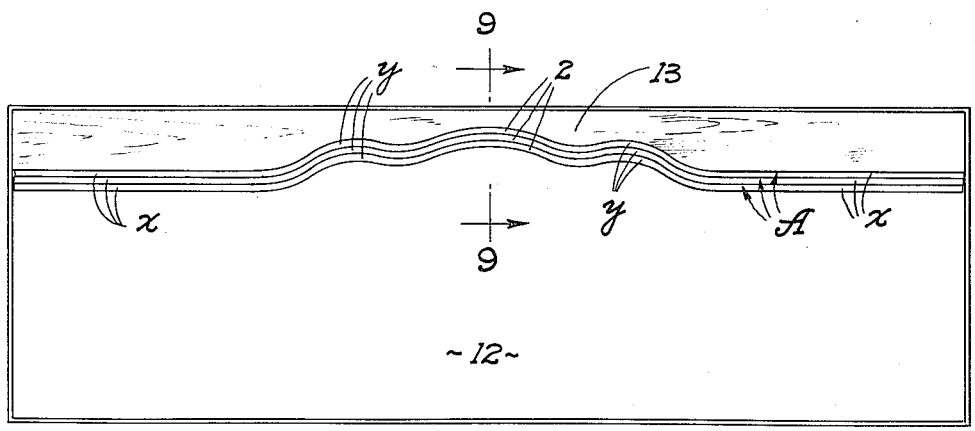
Figure 9:
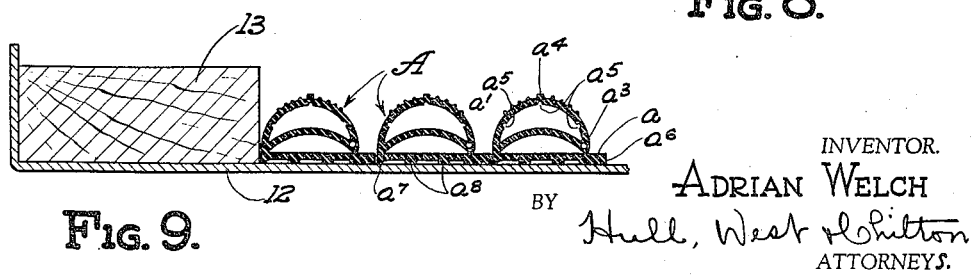

The foregoing objects, with others hereinafter appearing, are attained in the embodiment of the invention illustrated in the accompanying drawings wherein Fig. 1 is a perspective view of a fragment of my improved gasket strip; Fig. 2 is a fragmentary perspective view of a refrigerator showing the door open and equipped with a gasket constructed in accordance with my invention; Fig. 3 is a sectional detail, in perspective, of the edge of the door with the gasket incorporated therein; Fig. 4 is a section through the edge portion of the door and the adjacent part of the refrigerator cabinet showing the compressed condition of the gasket when the door is closed; Fig. 5 shows a mitered joint between sections of a gasket with the reinforcing element indicated in dotted lines; Fig. 6 is a perspective view of the reinforcing element; Fig. 7 is an inside elevational view of a refrigerator door equipped with the gasket; Fig. 8 is a plan view of a pallet provided with a templet by which the method is carried out of shaping the gasket strip to better conform to the top and side edges of the door of Fig. 7, the present view being on a smaller scale than the former one, and Fig. 9 is an enlarged sectional detail on the line 9—9 of Fig. 8.

The gasket strip, made of rubber or the like, and designated generally by the reference letter A, is an integral unit, desirably produced by the extrusion process, comprising a base flange $a$ and a cushion $a'$ that is desirably hollow and of crescent or half-moon shape in cross section, the same being connected at its outer edge, as indicated at $a^2$, to the corresponding edge of the base flange $a$. The relatively sharp free inner edge of the cushion is in close proximity to the base flange when the strip is in normal or relaxed condition. A bore or channel $a^3$ extends lengthwise through the unit very close to the inner free edge of the cushion $a'$, and the outer side of the cushion is provided with a longitudinal rib $a^4$ about midway between the edges thereof. Grooves $a^5$ are formed on the inner side of the outer wall of the cushion $a'$, lengthwise thereof, one being located near each lateral edge of said wall, and another directly beneath the rib $a^4$. On its side remote from the cushion $a'$, the base flange is shown as having a relatively wide longitudinal rib $a^6$ along its free edge, a narrower rib or bead $a^7$ at its opposite edge, and two spaced ribs $a^8$ along its longitudinal central region, all being of approximately the same depth.

The door or closure, designated generally by the reference numeral 1, is made up of an outer panel 2, desirably of sheet metal, and an inner panel 3, desirably of a suitable plastic material. The edge portion of the outer panel is formed about a frame 4 and overlaps the inner side thereof for a substantial distance inwardly of the edge of the door. The inturned edge portion of the outer panel 2 is designated 5. The space between the inner and outer panels of the door is filled with a suitable insulating material 6.

In the instant case, as will be seen by reference to Fig. 7, the door wherewith the gasket is used has parallel lateral edges that join a straight bottom edge at right angles and merge into rounded top corners that are connected by a slightly curved top edge. In order to produce a gasket that will properly fit such a door, a continuous strip is used across the top, about the rounded upper corners and down the sides, and a separate strip is used across the bottom. The ends of the first mentioned strip are mitered to the ends of the bottom strip in the manner illustrated in Fig. 5. To produce a joint of the character shown, the ends of the strip sections are cut at an angle of 45°; the ends of a right angle anchorage element B, to which cement or the like may be applied, are inserted into the bores $a^3$ of the juxtaposed ends of the strip sections, after which said ends, with cement applied thereto, are pressed together and the joint vulcanized in the customary manner. When thus fabricated, with the reinforcing element embedded therein, the joint is exceedingly strong and the gasket may be readily stretched over the panel 3 without liability of separation at the mitered joints.

In order to insure a proper fit of the gasket about the top edge of the door, the strip section that constitutes the top and sides of the gasket is pre-formed by a method I shall now describe. As the strip is extruded through a die which gives it the desired cross sectional shape, a length is severed therefrom that will make the section of the gasket just referred to, and said length is laid upon a pallet 12 against a templet 13. This templet imparts a shape to the section of extruded material (which, before curing, is pliable and of somewhat the consistency of putty) providing straight portions $x$, curved portions $y$ that join the former portions through reversely curved parts, and a central curved portion $z$ that is similarly joined to the former curved portions. Strip sections to the capacity of the pallet are placed side by side thereon, after which the templet 13 may be removed and the pallet conveyed to an oven wherein the strip sections are cured. By this method of shaping the gasket section, it is caused to conform nicely to the profile of the panel 3. When the gasket is completed and stretched over the edge of the panel, it hugs the same snugly and lies flat thereabout, the straight portions $x$ extending along the sides of the panel; the curved portions $y$ fitting about the rounded corners thereof, and the central curved portion $z$ following the similarly curved top of the panel. An important feature resides in the reversely curved parts through which the foregoing portions are joined together. These parts, by reason of their shape and inherent resiliency, tend to press in against the edge of the panel at places where, otherwise, there would be a tendency for the gasket to bulge or draw away from the panel.

In assembling the door, the fabricated gasket is stretched over the edge of the inner panel 3 with the base flange $a$ on the outer side and the cushion $a'$ on the inner side thereof. Said panel, with the gasket thus mounted upon it, is applied to the door structure so that the ribs and bead on the base flange $a$ of the gasket engages the inturned part 5 of the outer panel 2. Fastening means 10, as screws, are used to secure the inner panel 3 to the door structure, and said means are placed within the area covered by the cushion $a'$ so as to be concealed thereby, the resiliency of the gasket causing said cushion to normally repose with its inner free edge tightly engaged with the panel 3. By reason of the flexibility of the gasket, the cushion may readily be stretched aside so as to afford convenient access to the fastening means 4 but when released will resume the normal condition aforesaid. As will be observed from Figs. 3 and 4, the fastening means or screws 10 penetrate the flange $a$ between the ribs $a^8$, said ribs preventing the central portion of the base flange from withdrawing from the panel 3. Thus it will be seen that the base flange effectively seals the joint between the inner and outer panels of the door to the exclusion of moisture and prevention of condensation within the interior of the door structure.

The refrigerator cabinet, which may be of any desired construction, is designated 15, and the door is suspended therefrom by hinges 16.

Where the term "rubber" is used in the claims, it is intended to embrace synthetic rubber as well as that produced from latex.

Having thus described my invention, what I claim is:

1. A gasket comprising sections of an extruded strip of rubber including a relatively flat base flange and a cushion member of crescent shape in cross section that is attached along one edge to an edge of the base flange and overhangs said flange with its concave side in opposed relation thereto, the cushion member having a longitudinal bore in its free edge portion, ends of said sections being joined together at an angle to each other, and a stiff reinforcing element having its ends of corresponding angular relation and embedded in the bores of the ends of the sections, said element being confined to the region of said joined ends.

2. A gasket element consisting of an elongated unit of rubber including a hollow cushion member having an outwardly bulged contact portion characterized by longitudinal grooves on its inner side that define bending lines when the cushion member is compressed and under which circumstances one of said grooves expands while others on opposite sides of the former groove contract.

3. A gasket element comprising an elongated unit of rubber including a relatively flat base flange and a cushion member of crescent shape in cross section and attached along one edge to an edge of the flange and overhanging said flange with its free edge in juxtaposition to the corresponding edge of the base flange, the cushion member having a longitudinal ridge on the exterior of its wall remote from the base flange substantially midway between its lateral edges, the inner surface of said wall having longitudinal grooves near its lateral edges and one in the region of said ridge.

4. A gasket comprising strips of rubber having longitudinal bores and having their ends connected together to produce an angle joint, the walls surrounding said bores being relatively thin, and a stiff reinforcing element of uniform cross-section from end to end and of a size to fit the bore, the same having its end portions of corresponding angular relation and embedded in the bores of the respective strips so that said element is completely concealed, the same being confined to the region of the joint.

5. A gasket element consisting of an elongated unit of rubber including a hollow cushion member having an outwardly bulged contact portion and characterized by laterally spaced parallel longitudinal grooves on its inner sides defining bending lines when the cushion member is compressed thereby to provide a series of parallel bearing and sealing ridges spaced apart transversely of the cushion member.

ADRIAN WELCH.